United States Patent [19]

Sakakibara et al.

[11] 4,096,286

[45] Jun. 20, 1978

[54] STABLE PRECURSOR FOR MAKING AN EDIBLE GEL, AND METHOD OF MAKING AND USING THE SAME

[75] Inventors: Sakuichi Sakakibara, Kobe; Ko Sugisawa; Yasushi Matsumura, both of Nara; Hidefumi Okamoto, Sakai, all of Japan

[73] Assignee: House Food Industrial Company Limited, Osaka, Japan

[21] Appl. No.: 791,012

[22] Filed: Apr. 26, 1977

[30] Foreign Application Priority Data

Jun. 10, 1976 Japan .................................. 51-67137

[51] Int. Cl.² .............................................. A23L 1/04
[52] U.S. Cl. .................................... 426/577; 426/412; 426/589
[58] Field of Search ............................... 426/577, 412

[56] References Cited

U.S. PATENT DOCUMENTS 2,703,758  3/1955  Leo et al. .............................. 426/577
2,910,365  10/1959  Histon .................................. 426/577

Primary Examiner—Jeanette M. Hunter
Attorney, Agent, or Firm—Hans Berman

[57] ABSTRACT

A mixture of pectin, an edible mono- or disaccharide, an edible organic acid, an edible salt of an organic acid, and at least one further ingredient of the group consisting of fruit pulp, fruit juice, syrup, flavoring agents, coloring agents, and water, when sterilized and maintained under sterile conditions, has a long storage life and is quickly converted to an edible gel at ambient temperature by mixing with an edible source of calcium ions, such as milk. For a gel of pleasant taste and texture, the initial mixture should contain, per gram of pectin, 2.5 to 30 g of the saccharide, 0.15 to 0.75 g organic acid, 22.3 to 85 g water. It should further contain 1 g to 1.5 g of the organic acid salt per gram of the organic acid, and enough of the acid and salt to make the pH of the mixture 3.0 to 4.3. 25 to 40% of the carboxyl groups in the pectin are to be esterified with methanol.

10 Claims, No Drawings

STABLE PRECURSOR FOR MAKING AN EDIBLE GEL, AND METHOD OF MAKING AND USING THE SAME

This invention relates to edible gels, and particularly to a precursor composition which is stable in extended storage, and from which an edible gel can be prepared in a simple manner, to a method of making the precursor composition, and to the method of making the gel from the precursor composition.

Many types of edible gels are consumed as desserts, and precursor products for preparing the gels are staple articles of commerce. It is an object of this invention to provide a stable precursor composition from which an edible gel of pleasant taste and texture is prepared in a simple manner. The invention also provides a method of making the precursor product, and a quick method of converting the same to an edible gel.

It is known that aqueous pectin solutions are gelled by the admixture of divalent ions, such as calcium and magnesium. Gel foods generally are preferred to have an acidic taste, and gels prepared in a conventional manner from aqueous pectin solutions, divalent metal ions, and enough acid to give them the desirable acidic taste, cannot contain milk or other colloidal solutions of protein because the mixtures curdle and make the gel grainy. If the amount of acid is reduced to avoid coagulation of the protein, the taste of the food is not normally acceptable.

It has been found that pectin solutions of pH 3.8 to 4.3 can be gelled by means of the calcium in milk to a smooth food product if the pH of the pectin solution is achieved by means of an edible organic acid and an edible salt of an organic acid in a weight ratio of one part acid to 1 to 1.5 parts salt.

Not only the taste, but also the texture of the gel ultimately produced is greatly improved by the presence of an edible saccharide, that is, a monosaccharide or disaccharide. For economical reasons, sucrose in the form of granulated sugar, powder sugar, or brown sugar is preferred. However, other monosaccharides and disaccharides have a closely similar effect on the texture, and those having at least some of the sweetness of sucrose are entirely suitable because of their taste, glucose being a primary representative of such other saccharides. Based on one gram of pectin, the weight of the saccharide in the pectin solution should be between 2.5 and 30 g.

The organic acid employed has a decisive effect on the texture of the gel and contributes the desired mildly acidic taste. Citric, tartaric, malic, and lactic acid are sufficiently strong to produce the necessary low pH in the presence of other ingredients and are inexpensive, while lacking the characteristic taste and flavor which excludes from consideration other acids capable of contributing to gel formation, such as the lower alkanoic acids and their simple substitution products. The salts of the same acids may be used to bring about the desired buffer effect. The organic acid should amount to 0.15 g to 0.75 g per gram of pectin.

Optional ingredients include fruit pulps, fruit juices, syrups, that is flavored or plain concentrated sugar solutions, natural and artificial flavoring and coloring agents. To the extent that the water necessary for dissolving the pectin and the saccharide is not contributed by the optional ingredients, enough water needs to be added to a weight ratio of 22.5 to 85 g water per gram of pectin.

Pectin whose carboxyl groups are esterified with methanol to a large extent does not form smooth gels in the pH range required by this invention for compatibility with such protein-bearing sources of calcium ions as cow milk and milk from other mammals. The carboxyl groups in the pectin employed for the purpose of this invention thus should be esterified with methanol to an extent of not more than 40%, and pectin containing fewer than 25% carbomethoxy groups, based on the total number of carboxyl groups present, is not readily available.

For reasons not yet fully understood, it is not sufficient to select the ratio of edible organic acid and edible organic acid salt solely on the basis of the ultimate pH of the pectin solution. The weight ratio limits of acid and salt set forth above have an important bearing on the quality of the gel produced primarily by reaction of the pectin with calcium ions in the presence of a colloidal protein dispersion, such as milk.

The optional ingredients enumerated above have little effect on the basic qualities of the gel ultimately obtained. Fruit juices containing organic acids and/or organic acid salts may call for reduction in the admixed amounts of other organic acids or acid salts. Similarly, the sugar in a small amount of added syrup needs to be considered in selecting the proper amount of mono- or disaccharide.

An aqueous mixture of pectin, saccharide, acid and salt according to the invention may be stored for extended periods without losing its ability of forming a gel at ambient temperature upon mixing with a source of calcium ions if sterilized and maintained under sterile conditions until ready to be used. While sterilization by means of actinic radiation is feasible, it is much more economical at this time to resort to heat sterilization.

Batches of the pectin solution containing other ingredients, as discussed above, are preferably sealed hermetically in containers capable of withstanding the sterilization treatment, and then heated for 10 to 60 minutes at 100° to 75° C. The contents of the sealed containers then are ready for extended storage. Plastics, metals and glass are suitable container materials. Sterilizing in a sealed container has the added advantage of preserving the taste and aroma of fruit juice and fruit pulp present.

When it is desired to prepare a gel, a container is opened, and its contents are combined with an edible source of calcium ions, preferably a source which itself contributes to the nutritional value and the taste and/or texture of the resulting gel. Whole cow's milk, evaporated or condensed milk, milk powder, and milk reconstituted from evaporated or condensed milk, or from milk powder are preferred calcium sources. Milk from such other mammals as sheep, goats, or camels is equally effective, but the taste and flavor imparted thereby to the gel may be objectionable.

The following Examples further illustrate this invention. The pectin employed contained 25% to 40% methylated carboxyl groups.

EXAMPLE 1

40 g Granulated sugar, 2.8 g pectin, and 0.6 salt as a seasoning agent were dissolved in 95 g water by stirring for 10 minutes at 75° C. The solution was cooled to room temperature and mixed with 40 g orange pulp and 10 g orange juice. Thereafter, 1 g citric acid was added, and 1.35 g sodium citrate had to be added further to raise the pH to 4.05.

The mixture so obtained was sealed in a plastic bag, and the bag with its contents was immersed for 15 minutes in water at 90° C. The bag then was cooled in cold water, opened, and its contents were mixed with an equal volume of whole cow's milk.

A gel formed almost instantaneously and was soft enough to be cut with a spoon. It was smooth and homogeneous and had a mild flavor characteristic of the added orange pulp and juice. Its coefficient of viscosity was 6,500.

When the procedure described above was repeated, except for a reduction in the amount of sodium citrate to 0.8 g, the mixture had a pH value of 3.40. The gel formed was visibly inhomogeneous and contained lumps of harder material in a softer matrix. Its coefficient of viscosity was only 2,000. The inhomogeneity of the gel was unpleasant in the mouth, and it felt sticky. There was no significant loss of orange flavor.

In yet another run, the sodium citrate was increased to 1.8 g under otherwise unchanged conditions. The resulting pH was 4.50. The addition of milk to the sterilized mixture resulted in the formation of a soft and sticky mass having a viscosity index of 1,500. It felt in the mouth more like a liquid than a gel, and insufficient acidity unfavorably affected both the taste and the flavor of the product.

Ultimately, the first-described procedure was repeated except for the heating step. The mixture adjusted to pH 4.05 with 1.35 g sodium citrate was immediately mixed with an equal volume of cow's milk. The consistency and viscosity coefficient of the gel so produced were unaffected by the omitted heating step, but the gel appeared not quite as smooth in the mouth, the taste was distinctly inferior, and there was an unexpected loss in flavor.

EXAMPLE 2

An aqueous solution was prepared by stirring and heating 40 g granulated sugar, 2.6 g pectin, 0.8 g malic acid, 0.5 g sodium malate, 0.6 g sodium citrate, 0.55 g sodium chloride, 5 g sugar syrup, and 93 g water. The solution was homogeneous after being held at 70° C for 10 minutes. It was then cooled to room temperature and further intimately mixed with 40 g orange pulp, 10 g orange juice, and small amounts of artificial flavoring and coloring agents. The pH of the resulting mixture was 4.02.

The mixture was sealed in a bag of heat resisting plastic which was thereafter immersed in water at 90° C for 20 minutes. After cooling to room temperature, the bag was opened, and its contents were mixed with 190 g milk. The composition so obtained gelled within approximately one minute. The consistency, taste, and aroma of the gel was closely similar to that of the first batch of gel described in Example 1.

EXAMPLE 3

As in the preceding Examples, 41 g granulated sugar, 2.7 g pectin, 0.85 g citric acid, 1.1 g sodium citrate, 0.57 g sodium chloride, and 4 g sugar syrup were dissolved in 110 g water at elevated temperature. After cooling to ambient temperature, the solution was further mixed with 30 g strawberry pulp and small amounts of artificial flavoring and coloring agents. Its pH was 4.01. It was sealed in a plastic bag, held at 92° C for 18 minutes, and thereafter cooled to ambient temperature. The contents of the bag were thereafter mixed with 190 g whole cow's milk to produce a gel of smooth, homogeneous texture, and pleasant, slightly acidic fruit flavor and taste within about a minute.

Additional batches of the heat treated gel precursor solutions described in Examples 2 and 3 were stored sealed in their plastic bags, and individual bags were opened from time to time to test the ability of the stored liquid of forming instantaneous gels with milk. No loss in gelling ability of the mixtures and no loss of quality in the gels formed could be detected in the series of tests which lasted for more than two months.

The butterfat in whole milk favorably affects the taste of the gels prepared therefrom, but reconstituted skim milk solids (instant nonfat dry milk) of good quality produced almost equally tasty gelled desserts. Equally favorable results were achieved with evaporated and condensed milk of high quality. A strong "cooked" flavor and aroma characteristic of inferior grades of these milk products may not be entirely masked by the flavoring or seasoning ingredients of the gel, such as the fruit pulp or juice.

The quantity of milk added to the gel precursor is not critical. It should supply at least 1 g, and preferably 4 g, calcium (and magnesium) per 100 g pectin if the entire available pectin is to be gelled. When the precursor composition contains 1 g pectin per 22.5 to 85 g water, as indicated above, 100 g of the pectin composition should be mixed with 75 to 140 g whole cow's milk of average composition, but these limits are not overly critical.

The final mixture gels quickly at all practical room temperatures, slower at temperatures of less than 5° C. Stirring is helpful for uniform gelling.

A calcium-bearing colloidal dispersion of soybean protein is a good substitute for milk in preparing the gels of the invention. The dispersion is obtained as a milky liquid by soaking soybeans in hot water and thereafter crushing them. It coagulates at pH values outside the range of 3.8 to 4.3, but forms smooth gels with the pectin solutions of the invention.

Fruits other than those specifically mentioned in the preceding examples may be employed as flavoring agents. Peaches, pineapples, and bananas have been used successfully, but others are obviously suitable. The ratio of added organic acid and organic acid salt may have to be adjusted within the weight limits indicated above to maintain the necessary pH value in the presence of very sour fruit or of overripe fruit, and the amount of saccharide is to be chosen within the indicated range for adequate sweetness, the texture of the gel being impaired both by an excess and too low an amount of saccharide.

It should be understood, of course, that the foregoing disclosure relates only to preferred embodiments of the invention, and that it is intended to cover all changes and modifications of the examples of the invention herein chosen for the purpose of the disclosure which do not constitute departures from the spirit and scope of the invention set forth in the appended claims.

What is claimed is:

1. A method of preparing a precursor for an edible gel which comprises:
   (a) mixing pectin, an edible saccharide, an edible organic acid, an edible salt of an organic acid, and at least one member of the group consisting of fruit pulp, fruit juice, syrup, flavoring agents, coloring agents, and water,
      (1) the amounts of the mixed pectin, saccharide, acid, salt, and at least one member being such that the resulting mixture contains, per gram of said pectin, 2.5 to 30 g saccharide, 0.15 to 0.75 g organic acid, and 22.5 to 85 g water, and
(2) the weight ratio of said acid to said salt is between 1:1 and 1:1.5 and sufficient to make the ph value of said mixture 3.8 to 4.3,
(3) 25 to 40% of the carboxyl groups in said pectin being esterified with methanol;
(b) sterilizing said mixture; and
(c) maintaining the sterilized mixture under sterile conditions.

2. A method as set forth in claim 1, wherein said saccharide is a mono- or disaccharide.

3. A method as set forth in claim 2, wherein said edible organic acid is citric, tartaric, malic, or lactic acid, and said salt of an organic acid is an alkali metal salt of citric, tartaric, malic, or lactic acid.

4. A method as set forth in claim 1, wherein said mixture is sterilized by heating at a temperature of 100° to 75° C for 10 to 60 minutes.

5. A method as set forth in claim 4, wherein said mixture is heated at said temperature while sealed from the ambient atmosphere, and kept sealed from said atmosphere for said maintaining under sterile conditions.

6. A precursor composition for an edible gel, stable during extended storage and comprising:
(a) an airtight container; and
(b) a sterile aqueous mixtue hermetically sealed in said container, said mixture essentially consisting of pectin, an edible mono- or disaccharide, an edible organic acid, an edible salt of an organic acid, and at least one member of the group consisting of fruit pulp, fruit juice, syrup, flavoring agents, coloring agents, and water,
(1) said mixture containing, per gram of said pectin, 2.5 g to 30 g of said mono- or disaccharide, 0.15 to 0.75 g of said organic acid, and 22.3 to 85 g water,
(2) the weight ratio of said acid to said salt being between 1:1 and 1:1.5 and sufficient to make the pH value of said mixture 3.8 to 4.3,
(3) 25 to 40% of the carboxyl groups in said pectin being esterified with methanol.

7. A method of preparing an edible gel from the precursor composition set forth in claim 6 which comprises:
(a) opening said container; and
(b) combining said mixture with an edible source of calcium ions in an amount sufficient to cause gelling of the combined mixture and source.

8. A method as set forth in claim 7, wherein said source is a calcium-bearing, aqueous, colloidal dispersion of a protein.

9. A method as set forth in claim 8, wherein said dispersion is a milk of a mammal.

10. A method as set forth in claim 8, wherein said protein is soybean protein.

* * * * *